United States Patent [19]
Danford

[11] 3,910,605
[45] Oct. 7, 1975

[54] GANG HITCHING APPARATUS
[75] Inventor: Jack DeWayne Danford, Denver, Colo.
[73] Assignees: Jack DeWayne Danford; H. H. Champlin, both of Denver, Colo.; part interest to each
[22] Filed: July 29, 1974
[21] Appl. No.: 492,538

[52] U.S. Cl............................. 280/415 R; 172/625
[51] Int. Cl.²... B60D 1/16; B60F 5/00; B62D 53/00
[58] Field of Search........ 280/411 R, 411 A, 415 R, 280/415 A; 172/240, 625

[56] References Cited
UNITED STATES PATENTS

| | | | |
|---|---|---|---|
| 1,963,426 | 6/1934 | Taylor | 172/625 X |
| 2,696,772 | 12/1954 | Underdown | 172/240 X |
| 3,240,005 | 3/1966 | Rowse | 280/415 R X |
| 3,610,661 | 10/1971 | Pierce | 280/411 A X |
| 3,635,495 | 1/1972 | Orendorff | 280/415 R |

FOREIGN PATENTS OR APPLICATIONS
1,143,622   4/1957   France................................ 172/625

Primary Examiner—Leo Friaglia
Assistant Examiner—R. Schrecengost
Attorney, Agent, or Firm—Sheridan, Ross & Fields

[57] ABSTRACT

There is provided a gang hitching apparatus for pulling a plurality of farm implement units and including a longitudinally extending hitch bar, a centrally located forwardly extending main draft bar having a tongue portion hinged for rotation about an axis transverse to the draft bar between a stored position and an operative position. There are also provided a pair of front wheels and a pair of rear wheels for supporting the hitch bar in spaced relation to the ground, the axles of each of the wheels individually adapted to be rotated about a vertical axis of at least 90° whereby the hitch bar is selectively movable in a direction normal to its longitudinal axis and in a direction corresponding to its longitudinal axis. The hitch bars of the present invention are characterized by very low profile and relatively narrow width for highway travel.

4 Claims, 10 Drawing Figures

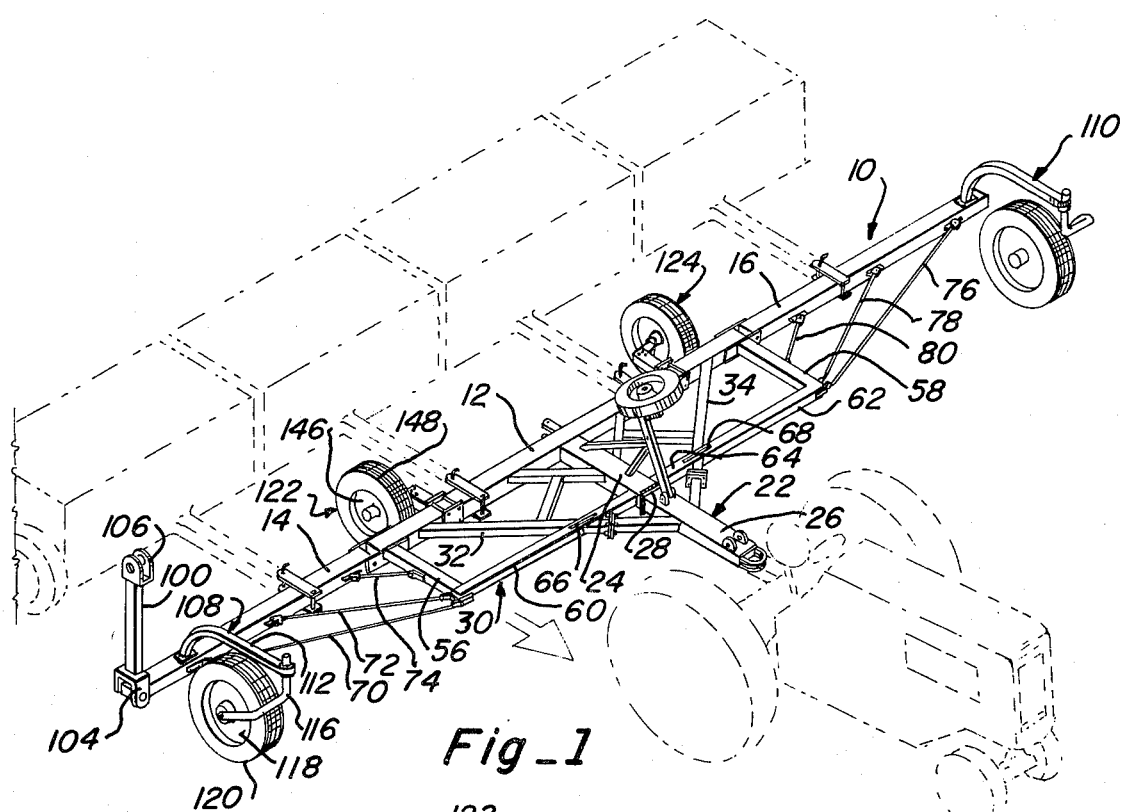
Fig_1
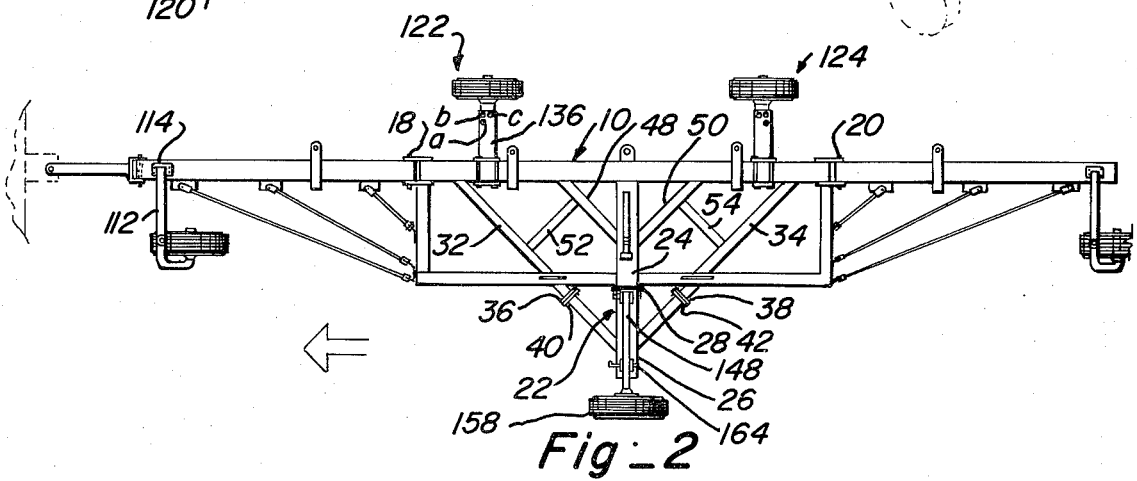
Fig_2
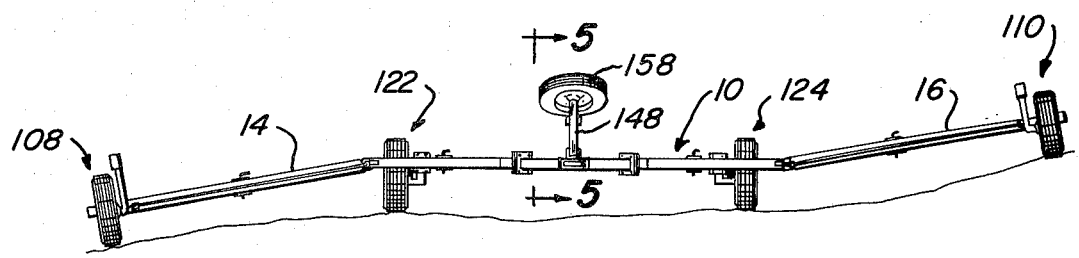
Fig_3

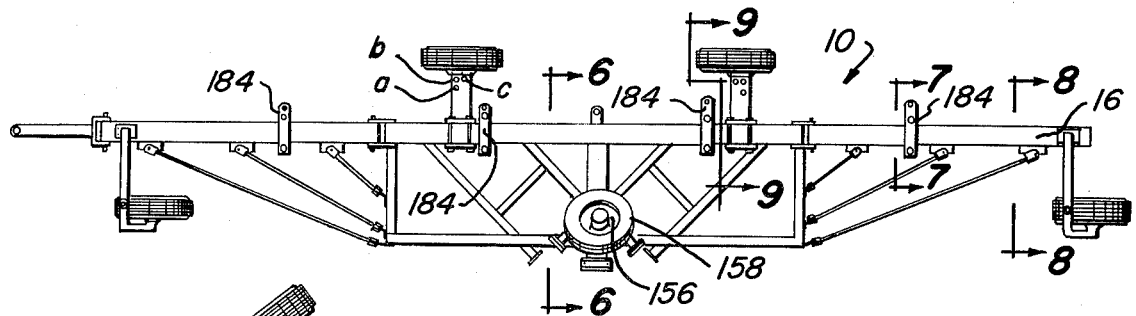
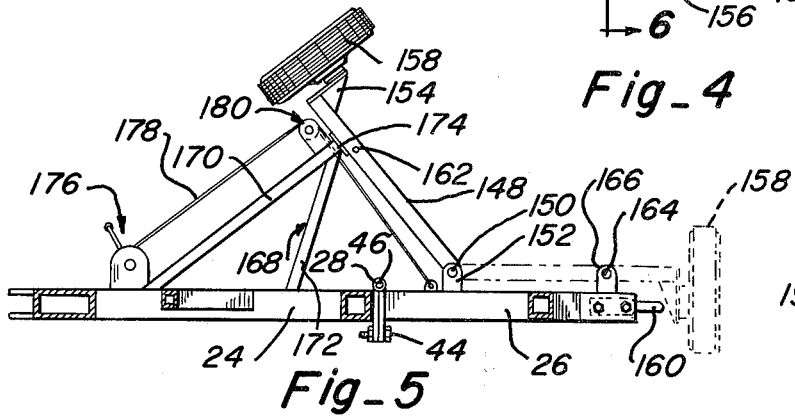
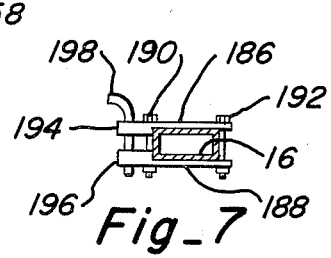
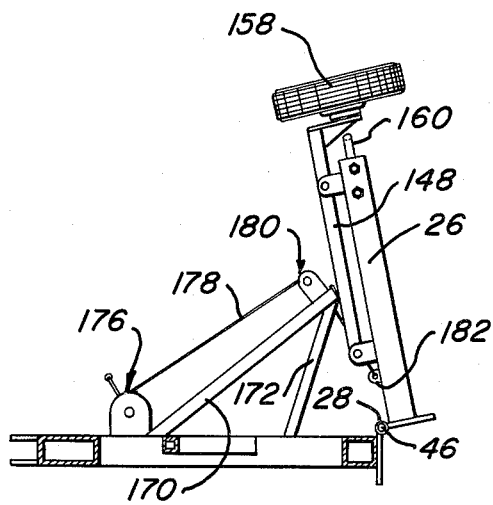
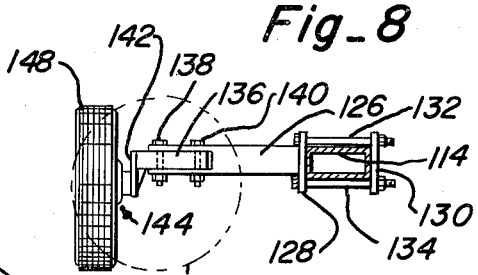
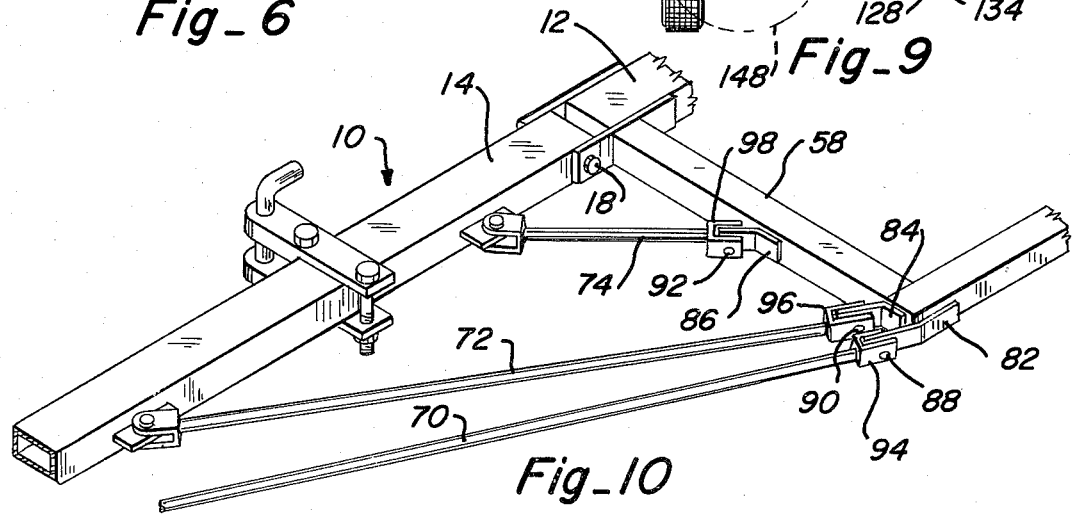

GANG HITCHING APPARATUS

BACKGROUND OF THE INVENTION AND PRIOR ART

The present invention relates, as indicated, to a gang hitching apparatus for pulling a plurality of farm implement units, e.g., drills. Although gang hitching devices have been produced prior to this time to which a relatively large number of farm implements could be attached, these were characterized by an inability to move along a highway because of excessive width. In effort to comply with state laws regarding the width of devices which may be towed along a highway, efforts were made to fold the devices giving rise to yet another problem, namely, inability to pass under an overpass. Devices of the type contemplated hereby reach a longitudinal length of up to 60 feet or more, and width, in prior art devices, of as much as 30 feet. Consequently, the problem of compressing a device this size into an envelope which is within both state regulations and physical limitations, e.g, those imposed by a highway overpass, is indeed a difficult one.

The present invention provides an improved structure which is readily adaptable for traverse along a highway and when folded as indicated below will pass under any overpass where the clearance regulations are set by state or federal regulations.

BRIEF STATEMENT OF THE INVENTION

Briefly stated, the present invention is in a gang hitching apparatus for pulling a plurality of farm implement units, said hitching apparatus comprising in combination a longitudinally extending hitch bar and a main draft bar which is centrally located and forwardly extended. The main draft bar has a tongue portion hinged for rotation about an axis transverse to the draft bar and may, therefore, be rotated between a stored position and an operative position. There are also provided a pair of front wheels and a pair of rear wheels for supporting the hitch bar in spaced relation to the ground. The axles of each of these wheels are individually adapted to be rotated about a vertical axis of at least 90° whereby the hitch bar is selectively movable in a direction normal to the longitudinal axis and in a direction corresponding to its longitudinal axis.

In a more specific embodiment of the invention, the hitching apparatus is additionally characterized by an outrigger fifth wheel mounted at the outer extremity of an arm pivotally mounted on the draft bar and movable between a stored position and a ground engaging position ahead of the end of the draft bar. This latter embodiment enables the device to be moved conveniently not only along a highway, but without collapsing the tongue portion to its stored position, the device may also be readily moved from field-to-field without highway traverse.

BRIEF DESCRIPTION OF THE DRAWINGS

The present invention may be better understood by having reference to the annexed drawings wherein:

FIG. 1 is a perspective view of one embodiment of the present invention, and showing in dotted lines a tractor for pulling the apparatus and a plurality of farm implements attached to the hitch bar.

FIG. 2 is a top plan view of the device shown in FIG. 1 in which the wheels are disposed to permit a movement of the device in a direction longitudinal of the main hitch bar, and with the fifth wheel in the position for traverse from field-to-field.

FIG. 3 is a front elevation of the apparatus shown in FIG. 1 and illustrating not only its very low profile but also an embodiment wherein the main hitch bar is articulated to accommodate an uneven contour.

FIG. 4 is a top plan elevation of the apparatus shown in FIG. 1 with the wheels arranged for highway travel, and the tongue and fifth wheel in their respective stored positions.

FIG. 5 is a partial side elevation of the apparatus on an enlarged scale as it appears in the plane indicated by the line 5—5 in FIG. 3 and showing the tongue in its operative position, the fifth wheel in its stored position, and the fifth wheel shown in its field-to-field traverse position in dotted lines.

FIG. 6 is a partial side elevation of the apparatus on an enlarged scale as it appears in the plane indicated by the line 6—6 in FIG. 4 and showing the tongue in its stored position and the fifth wheel in its stored position.

FIG. 7 is a cross section through the main hitch bar showing one mode of attachment of a hitch and hitch pin for a farm implement.

FIG. 8 is a cross sectional view through the main hitch bar on an enlarged scale and as it appears in the plane indicated in the line 8—8 in FIG. 4.

FIG. 9 is a cross sectional view through the hitch bar on an enlarged scale as it appears in the plane indicated by the line 9—9 in FIG. 4.

FIG. 10 is a fragmentary perspective view on an enlarged scale showing one mode of stabilizing the draft bar supporting frame, and showing a hitch point for attachment of a farm implement. Also shown in a pivot point for the articulation of the main hitch bar.

DETAILED DESCRIPTION OF THE DRAWINGS

Referring now more particularly to FIGS. 1 to 4 inclusive, these figures show an embodiment of the present invention in the three principal modes of operation. Thus, FIG. 1 shows the apparatus in use pulling a plurality of farm implements, e.g., seed drills. FIG. 2 shows the apparatus arranged for movement from field-to-field utilizing the "fifth" wheel. FIG. 3 shows the apparatus in the operative mode of FIG. 1 traversing uneven terrain. FIG. 4 shows the apparatus folded into its most compact envelope for travel down a highway.

Accordingly, there is provided a main hitch bar generally indicated at 10 having a central portion 12, a right wing portion 14 and a left wing portion 16. Right and left wing portions 14 and 16 are pivotally secured to the central portion for movement in a vertical plane about horizontal pins 18 and 20, respectively. The pins 18 and 20 (FIG. 2) enable the apparatus to accommodate uneven terrain as illustrated in FIG. 3.

Extending forwardly from the center of the main hitch bar 10 is a main draft bar generally indicated at 22 and including a stationary portion 24 and a tongue portion 26. The tongue portion 26 is hingedly secured to the stationary portion 24 by means of a hinge 28, best seen in FIGS. 5 and 6. The hitch bar 10 and the draft bar 22 are principal structural elements of the structures of the present invention and are conveniently formed of steel box girders approximately 4 inches by 8 inches in size for a 60 foot hitch bar. A box-like framework generally indicated at 30 provides structural rigidity and support for the draft bar 22. The primary stress members of the box framework 30 are the angular members 32 and 34 which, in a preferred embodiment, are continuous between the hitch bar 10 and the draft bar 22. This continuity is severable, however, and to this end, each of the members 32 and 34 is provided with a stationary flange plate 36 and 38 respectively, and a movable flange plate 40 and 42, respectively. On the right hand side of the apparatus, (the left side as viewed in the drawing), the flange plates 36 and 40 are bolted together to form a continuous stress member 32. In like manner, the flange plates 38 and 42 are bolted together to form a continuous stress member 34.

As indicated above, the tongue portion 26 is hingedly secured to the stationary portion 24 by means of the hinge 28. When it is desired to rotate the tongue portion 26 to its stored position as shown in FIG. 6, the hinge bolts such as hinge bolt 44 (FIG. 5) is removed and the bolts securing the flanges 36 and 40 as well as the bolts securing together the flanges 38 and 42 are also removed. This permits the tongue portion 26 to be rotated about the hinge pin 46 to its stored position as shown in FIG. 6. Although the flanges 36 and 40, for example, could also be hinged together with a hinge pin on the same axis as the hinge pin 46 in the hinge 28, the mode of attachment and detachment of the stress bar segments such as shown in FIGS. 1 to 4 is preferred for ease of fabrication.

Secondary stress members 48 and 50 are conveniently provided angled back to the hitch bar 10 at preferably a 45° angle with cross bars 52 and 54 extending orthogonally thereto and between the primary stress members 32 and 34 and the secondary stress members 48 and 50 respectively. In order to provide a suitable mount for stabilizer members, the box frame portion 30 includes end members 56 and 58 on the right and left hand sides respectively, and a crossing support member including cross support portion 60, cross support member 62 and central support portion 64. Although the crossing member might be fabricated as a single piece of box beam material, as previously indicated, the primary stress members 32 and 34 are desirably continuous with the exception of the flanged portions above described, and accordingly the crossing member is desirably formed of three separate pieces strapped together as by welding straps 66 and 68. With the exceptions noted, the box framework 30 and its attachment to the hitch bar 10 is effected conveniently by welding. The structural members in the box framework 30 are conveniently also of box girder material dimensioned substantially in the proportions as shown in the drawings to the size of the main hitch bar 10.

As indicated, the end members 56 and 58 provide points of attachment of stabilizers such as stabilizer rods 70, 72 and 74 on the right hand side of the device and stabilizer rods 76, 78 and 80 on the left hand side of the device. The mode of attachment of the stabilizer rods 70, 72 and 74 is best shown in FIG. 10. The end member 58 is provided with welded angle brackets 82, 84 and 86, each provided with an eye (not shown) and adapted to receive a clevis pin such as clevis pins 88, 90 and 92 extending through clevises 94, 96 and 98 which are in turn welded to the extremities of stabilizer bars 70, 72 and 74, respectively. The clevis pins 98, 90 and 92 are horizontally disposed to facilitate rotation of the right hand hitch bar portion 14 about the horizontal pin 18 through the limited arc of rotation which will be encountered in uneven terrain.

As shown in the drawings, the hitch bar 10 is provided at its right hand extremity with an auxiliary draft bar 100 pivotally secured by means of pin 102 and clevis 104 secured to the proximal extremity of the auxiliary draft bar 100. The distal extremity of the draft bar 100 is provided with a suitable clevis or hitching bracket 106 for attachment to a tractor. While the apparatus is being used to draw a plurality of farm implements, the auxiliary draft bar 100 is carried in its inoperative position as shown in FIG. 1. When the apparatus is being moved in a direction longitudinal of the axis of the elongated hitch bar 10, the auxiliary draft bar 100 is rotated to a position such as shown in FIG. 2.

In order to support the apparatus as described thus far in spaced relation to the ground, there are provided at each of the right and left ends of the hitch bar 10 front swivel wheels 108 and 110 respectively. The swivel wheels 108 and 110 are of known conventional structure and readily mounted to the ends of the right and left hitch bar portions 14 and 16, respectively, by any suitable means. The details of one form of swivel wheel useful herein are shown in FIG. 8. In the embodiment shown in the drawings, there is provided a support bar 112 fitted with a flange 114. In one embodiment of the present invention the support bar 112 extends through the flange 114 and into a suitable square opening extending vertically through the hitch bar portion 14. The flange 114 is suitably bolted or welded to the upper surface of the hitch bar portion 14. At the forward extremity of the support bar 112, there is carried for rotation about a substantially vertical axis an axle support bar 116 having at its distal extremity a conventional axle and hub to which a wheel 118 carrying a conventional pneumatic tire 120 may be mounted.

Also provided for supporting the hitch bar 10 and the balance of the framework, are a pair of rear wheels including right rear wheel 122 and left rear wheel 124. The rear wheels 122 and 124 might also be swivel type wheels, but in the embodiment shown in FIG. 1 space limitation would not conveniently accommodate commercially available swivel type wheels and hence a wheel mounting such as that shown in FIG. 9 is used instead. Thus, in FIG. 9 there is shown a rear wheel support bar 126 having welded to its proximal extremity a mounting plate 128. As shown in FIG. 9 a back up mounting plate 130 is provided, and four bolts such as bolts 132 and 134 spanning the hitch bar portion 114 are used to tightly secure the rear wheel support arm 126 thereto, the mounting plates 128 and 130 clamping the hitch bar tightly therebetween. At the outer extremity of the support arm 126 there is provided an axle support member 136 secured thereto by means of bolts 138 and 140. A bracket 142 welded to the outer extremity of support member 136 carries the axle and hub assembly 144 on which the wheel 146 (FIG. 1) and the pneumatic tire 148 are mounted in a known manner. As best shown in FIG. 2, the axle support member 136 is conveniently provided with three bolt receiving holes defining a right angle. These holes are identified in FIGS. 2 and 4 as *a*, *b* and *c*. When the axle support member 136 is arranged as shown in FIG. 1, the bolts 138 and 140 extend through holes *b* and *c*. When the wheels are in the position shown in FIGS. 2 and 4, the bolts 138 and 140 are positioned through holes *a* and *b*. The rear wheel assembly 124 is of identical structure to that shown and described with respect to the wheel assembly 122, and no purpose will be served by duplicating that disclosure at this point it being understood that the wheels are of similar structure although disposed on opposite sides of their respective axle support members as shown in FIG. 1.

To change the rear wheels from normal operation in a forward direction as shown in FIG. 1, to a highway traversing position as shown in FIG. 4, it is necessary to jack up the central hitch bar portion 12, remove the bolts 138 and 140, for example, from holes *b* and *c* (FIG. 4), turn the axle support member about a vertical axis through 90° to a registry with holes *a* and *b* and reinsert and tighten bolts 138 and 140. The same operation is repeated for rear wheel assembly 124.

As indicated above, there is optionally provided a "fifth" wheel. This apparatus is most convenient when the gang hitching apparatus of the present invention is being moved from one field to an adjacent field without the necessity for traveling on a highway. The "fifth" wheel obviates the necessity for removing hinge bolts such as hinge bolts 44 and the bolts joining flanges 36 and 40 and bolts joining flanges 38 and 42. The disassembly and reassembly of these elements is time consuming, and by the utilization of a swingable "fifth" wheel assembly, the time of unbolting and rebolting can be saved. To this end, therefore, there is provided on the tongue portion as best shown in FIG. 5, a "fifth" wheel supporting arm 148 pivotally secured by means of a pin 150 to a bracket 152 which is in turn welded to or otherwise suitably secured to the tongue portion 26. At the distal extremity of the support arm 148, there is provided a hub and axle supporting bracket 154 to which is mounted in a known manner a wheel 156 (FIG. 4) to which is secured a pneumatic tire 158 in a known manner.

The support arm 148 is dimensioned to extend when in the operative position shown in dotted lines in FIG. 5 beyond the hitch pin eye 160 located at the outer end of the tongue portion 26. The support member 148 is provided with an eye 162 positioned for registry with a pin 164 extending through an arm supporting and locking bracket 166. Thus, when the "fifth" wheel supporting arm 148 is moved from its stored position as shown in FIG. 5 to its operative position shown in dotted lines in FIG. 5, and the locking pin 164 inserted through the locking bracket 166 and the eye 162 and secured, the "fifth" wheel is in operative position for supporting the tongue 126 in spaced relation to the ground. This mode of operation is clearly shown in the top plan view of FIG. 2.

To support the axle support member 148 in its stored position, there is conveniently provided a bumper generally indicated at 168 and, in the embodiment shown conveniently formed of support members 170 and 172 joined at their outer ends to form a bumper rest 174, and welded at their opposite ends to the stationary draft bar portion 24.

As previously indicated, when the apparatus is to be moved down a highway, the bolts 44 (FIG. 5) are removed, and the tongue portion elevated to its stored position as shown in FIG. 6 by rotation about the hinge pin 46. In order to facilitate raising the tongue portion 26, a winch 176 having a cable 178 reeved thereabout and through a head pulley assembly 180, and anchored to a cable eye bracket 182 welded to the tongue 26 may be employed. Any suitable means for assisting and elevating the tongue portion 26 to its stored position and holding it there may be employed.

At spaced intervals along the articulated hitch bar 10 as shown in FIG. 4 there is provided a plurality of hitching eyes 184. One form which the hitching eyes may take is shown in enlarged detail in FIG. 7. To attach such eyes to the hitch bar 10, there are provided top and bottom plates 186 and 188 dimensioned for attachment across the left wing portion 16, for example, and held tightly in position by means of bolts 190 and 192 clamping the members 186 and 188 together. Projecting portions 194 and 196 are provided with suitable eyes alignment for receipt of hitch pin 198. These hitches are used in a known manner to attach farm implements or, in some cases, a pair of such farm implements. When the apparatus is to be moved in the direction indicated in the FIGS. 2 and 4, the farm implements are removed from the hitches 184, and the pins, e.g., pin 198, returned to their normal positions. When the wheels are arranged as shown in FIG. 1, for example, then the farm implements may be attached to the hitch bar 10 in the manner indicated.

What is claimed is:

1. A gang hitching apparatus for pulling a plurality of farm implement units, said apparatus comprising:

a longitudinally extending hitch bar;

a plurality of hitching eyes spaced along said hitch bar extending from one side thereof for attachment to a plurality of farm implement units to be pulled by said hitch bar;

a centrally located main draft bar pivotally connected to a second side of said hitch bar opposite said first side thereof for movement between an operative position extending forwardly of said second side for connection to a pulling vehicle and an inoperative position extending upwardly from said hitch bar;

an auxiliary draft bar connected to one end of said hitch bar for movement between an operative position for moving said apparatus in a direction corresponding to the longitudinal axis of said hitch bar and an inoperative position so that it does not extend longitudinally beyond said one end of said hitch bar;

a plurality of wheels pivotally attached to opposite sides of said hitch bar about vertical axes and spaced so as not to interfere with farm implements connected to said hitching eyes, the axle of each of said wheels being rotatable about its respective vertical axis at least 90° so that said hitch bar is selectively movable in either direction perpendicular to its longitudinal axis by a vehicle connected to said main draft bar or in a direction corresponding to its longitudinal axis by a vehicle connected to said auxiliary draft bar; and a fifth wheel assembly having:

a supporting arm pivoted at one end about a horizontal pivot to said apparatus independently of the pivotal movement of said main draft bar from an operative horizontal position to an inoperative raised position;

a fifth wheel mounted on the other end of said supporting arm for engagement with the ground forwardly of said main draft bar when both said main draft bar and said supporting arm are in horizontal position; and means for holding said supporting arm in either said horizontal position or said raised position.

2. A gang hitching apparatus, as claimed in claim 1, wherein:

said supporting arm is pivotally mounted on said main draft bar for both independent pivotal movement between said horizontal position and said raised position when said main draft bar is in said operative position and simultaneous pivotal movement when said main draft bar is moved from said operative position to said inoperative position.

3. A gang hitching apparatus, as claimed in claim 2, further including:

means for simultaneously moving said fifth wheel assembly and said main draft bar between said horizontal and said raised positions.

4. A gang hitching apparatus, as claimed in claim 3, wherein said moving means include:

a winch mounted on said hitch bar;

a pulley assembly extending above said hitch bar; and a cable connected at one end to said winch and at the other end to said main draft bar and extending over said pulley assembly.

* * * * *